(12) United States Patent
Kneckt et al.

(10) Patent No.: US 9,337,908 B2
(45) Date of Patent: May 10, 2016

(54) SPACE-TIME CHANNEL SOUNDING IN WIRELESS NETWORK

(71) Applicant: Nokia Corporation, Espoo (FI)

(72) Inventors: Jarkko Lauri Sakari Kneckt, Espoo (FI); Olli Alanen, Vantaa (FI); Toni Huovinen, Pirkkala (FI)

(73) Assignee: Nokia Technologies Oy, Espoo (FI)

( * ) Notice: Subject to any disclaimer, the term of this patent is extended or adjusted under 35 U.S.C. 154(b) by 300 days.

(21) Appl. No.: 13/916,749

(22) Filed: Jun. 13, 2013

(65) Prior Publication Data
US 2014/0369435 A1    Dec. 18, 2014

(51) Int. Cl.
*H04B 7/04* (2006.01)
*H04B 7/06* (2006.01)
*H04L 25/02* (2006.01)
*H04L 5/00* (2006.01)

(52) U.S. Cl.
CPC ............ *H04B 7/0413* (2013.01); *H04B 7/0417* (2013.01); *H04B 7/0643* (2013.01); *H04L 5/0048* (2013.01); *H04L 25/0224* (2013.01); *H04L 5/0051* (2013.01)

(58) Field of Classification Search
None
See application file for complete search history.

(56) References Cited

U.S. PATENT DOCUMENTS

| | | | | |
|---|---|---|---|---|
| 2005/0239465 | A1* | 10/2005 | Lee et al. | 455/436 |
| 2008/0225796 | A1* | 9/2008 | Malladi et al. | 370/331 |
| 2013/0114757 | A1* | 5/2013 | Park et al. | 375/295 |

* cited by examiner

*Primary Examiner* — Khoa Huynh
(74) *Attorney, Agent, or Firm* — Banner & Witcoff, Ltd.

(57) ABSTRACT

A method, apparatus, and computer program for carrying out channel sounding are provided. Said method comprises: causing, by an apparatus, transmission of a request for space-time channel sounding to at least one unassociated access node; receiving, in the apparatus as a multi-antenna transmission and in response to said request, at least one message comprising space-time sounding information from at least one unassociated access node; determining, by the apparatus, at least one parameter describing space-time channel quality from the received space-time sounding information; and causing, by the apparatus, transmission of the at least one determined parameter to an associated access node or causing selection of an unassociated access node for further communication based at least partly on the determined at least one parameter.

22 Claims, 3 Drawing Sheets

SPACE-TIME CHANNEL SOUNDING IN WIRELESS NETWORK

FIELD

The invention relates to the field of wireless networks employing multi-antenna transmission and spatial multiplexing.

BACKGROUND

Many wireless networks employ multi-antenna transmission schemes that are typically called MIMO transmission (multiple-input-multiple-output). Optimal MIMO transmission may comprise channel sensing and determining optimal transmission/reception parameters for the MIMO transmissions.

BRIEF DESCRIPTION

According to an aspect of the invention, there is provided a method comprising: causing, by an apparatus, transmission of a request for space-time channel sounding to at least one unassociated access node; receiving, in the apparatus as a multi-antenna transmission and in response to said request, at least one message comprising space-time sounding information from at least one unassociated access node; determining, by the apparatus, at least one parameter describing space-time channel quality from the received space-time sounding information; and causing, by the apparatus, transmission of the at least one determined parameter to an associated access node or causing selection of an unassociated access node for further communication based at least partly on the determined at least one parameter.

In an embodiment, the request for the space-time channel sounding comprises at least one of a probe request and a space-time channel sounding measurement indication.

In an embodiment, the apparatus is a terminal device associated to the associated access node.

In an embodiment, the method further comprises receiving, from the at least one unassociated access node before the reception of the at least one message comprising the space-time sounding information, a response to said request via omnidirectional transmission, the response serving as a channel sounding announcement.

In an embodiment, the at least one message comprises a probe response or a message received after receiving a probe response.

In an embodiment, the at least one message comprises a null data packet frame.

In an embodiment, the request comprises a request to recommend an access node for an association, the method further comprising in the apparatus: receiving a frame comprising an information element indicating an identifier of an unassociated access node recommended for association.

In an embodiment, the request comprises a notification that the apparatus will send a second message comprising space-time sounding information, the method further comprising in the apparatus: causing transmission of the second message after the request. In an embodiment, the second message is a null data packet.

In an embodiment, the at least one parameter comprises at least one of the following: a rank of the space-time channel specifying a number or uncorrelated space-time streams between the apparatus and the at least one unassociated access node, a metric representing received signal strength for one or more space-time stream, an estimate representing deterioration of space-time channel quality.

According to another aspect of the invention, there is provided a computer program product embodied on a transitory or non-transitory distribution medium readable by a computer and comprising program instructions which, when loaded into an apparatus, execute a computer process comprising the steps of any one of the above-described methods.

According to an aspect, there is provided a computer program product embodied on a transitory or non-transitory distribution medium readable by a computer and comprising program instructions which, when loaded into an apparatus, execute a computer process comprising: causing transmission of a request for space-time channel sounding to at least one unassociated access node; receiving, as a multi-antenna transmission and in response to said request, at least one message comprising space-time sounding information from at least one unassociated access node; determining at least one parameter describing space-time channel quality from the received space-time sounding information; and causing transmission of the at least one determined parameter to an associated access node or causing selection of an unassociated access node for further communication based at least partly on the determined at least one parameter.

According to another aspect, there is provided an apparatus comprising: at least one processor; and at least one memory including a computer program code. The at least one memory and the computer program code are configured, with the at least one processor, to cause the apparatus to: cause transmission of a request for space-time channel sounding to at least one unassociated access node; receive, as a multi-antenna transmission and in response to said request, at least one message comprising space-time sounding information from at least one unassociated access node; determine at least one parameter describing space-time channel quality from the received space-time sounding information; and cause transmission of the at least one determined parameter to an associated access node or cause selection of an unassociated access node for further communication based at least partly on the determined at least one parameter.

In an embodiment, the request for the space-time channel sounding comprises at least one of a probe request and a space-time channel sounding measurement indication.

In an embodiment, the apparatus is a terminal device associated to the associated access node.

In an embodiment, the at least one memory and the computer program code are configured, with the at least one processor, to cause the apparatus to receive, from the at least one unassociated access node before the reception of the at least one message comprising the space-time sounding information, a response to said request via omnidirectional transmission, the response serving as a channel sounding announcement.

In an embodiment, the at least one message comprises a probe response or a message received after receiving a probe response.

In an embodiment, the at least one message comprises a null data packet frame.

In an embodiment, the request comprises a request to recommend an access node for an association, and wherein the at least one memory and the computer program code are configured, with the at least one processor, to cause the apparatus to receive a frame comprising an information element indicating an identifier of an unassociated access node recommended for association.

In an embodiment, the request comprises a notification that the apparatus will send a second message comprising space-time sounding information, and wherein the at least one memory and the computer program code are configured, with the at least one processor, to cause the apparatus to cause transmission of the second message after the request. In an embodiment, the second message is a null data packet.

In an embodiment, the at least one parameter comprises at least one of the following: a rank of the space-time channel specifying a number or uncorrelated space-time streams between the apparatus and the at least one unassociated access node, a metric representing received signal strength for one or more space-time stream, an estimate representing deterioration of space-time channel quality.

In an embodiment, the apparatus further comprises radio interface components providing the apparatus with radio communication capability.

Embodiments of the invention are defined in the dependent claims.

LIST OF DRAWINGS

Embodiments of the present invention are described below, by way of example only, with reference to the accompanying drawings, in which.

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

Figure 1:
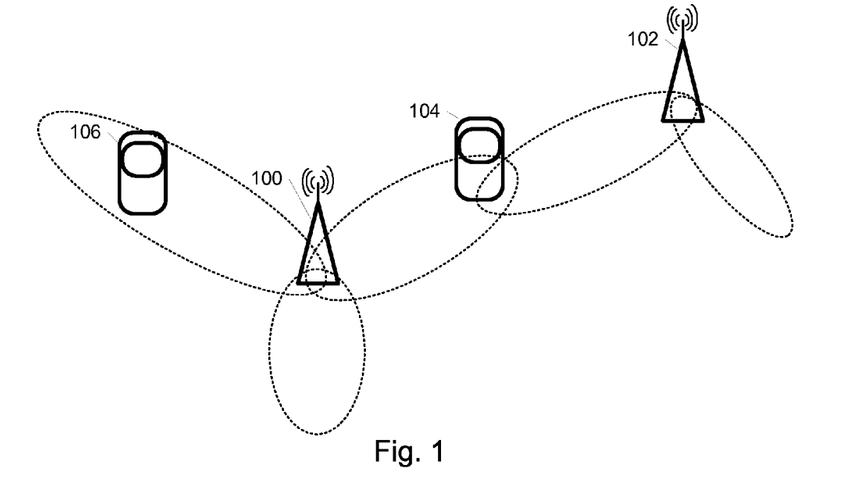
FIG. 1 illustrates a wireless communication scenario to which embodiments of the invention may be applied.

A general wireless communication scenario to which embodiments of the invention may be applied is illustrated in FIG. 1. FIG. 1 illustrates wireless communication devices comprising access points (AP) 100, 102 and a plurality of terminal devices (STA) 104, 106. The AP 100, 102 may be a stationary access point or a mobile access point. A general term used in this specification and encompassing both the APs and STAs is a wireless apparatus. The access point may refer to an access point specified in IEEE 802.11 specifications or to a base station of another wireless access network. At least one of the terminal devices 104, 106 may have a functionality of an AP as well. Therefore, a common term encompassing both the stationary APs 100 and mobile APs is an access node. An access node may provide or be comprised in a basic service set (BSS) which is a basic building block of an IEEE 802.11 wireless local area network (WLAN). Each access node may represent a different BSS. The most common BSS type is an infrastructure BSS that includes a single access node together with all STAs associated with the access node. The access node may provide access to other networks, e.g. the Internet. In another embodiment, the BSSs may be connected with each other by a distribution system (DS) to form an extended service set (ESS). An independent BSS (IBSS) is formed by an ad hoc network of terminal devices without a stationary controlling AP. While embodiments of the invention are described in the context of the above-described topologies of IEEE 802.11, it should be appreciated that these or other embodiments of the invention may be applicable to networks based on other specifications, e.g. WiMAX (Worldwide Interoperability for Microwave Access), UMTS LTE (Long-term Evolution for Universal Mobile Telecommunication System), mobile ad hoc networks (MANET), mesh networks, and other networks having cognitive radio features, e.g. transmission medium sensing features and adaptive capability to coexist with radio access networks based on different specifications and/or standards. Some embodiments may be applicable to networks having features under development by other IEEE task groups.

The different access nodes may operate at least partly on different channels, e.g. on different frequency channels. IEEE 802.11n specification specifies a data transmission mode that includes 20 megahertz (MHz) wide primary and secondary channels. The primary channel is used in all data transmissions with clients supporting only the 20 MHz mode and with clients supporting higher bandwidths. A further definition in 802.11n is that the primary and secondary channels are adjacent. The 802.11n specification also defines a mode in which a STA may, in addition to the primary channel, occupy one secondary channel which results in a maximum bandwidth of 40 MHz. IEEE 802.11ac task group extends such an operation model to provide for wider bandwidths by increasing the number of secondary channels from 1 up to 7, thus resulting in bandwidths of 20 MHz, 40 MHz, 80 MHz, and 160 MHz. A 40 MHz transmission band may be formed by two contiguous 20 MHz bands, and an 80 MHz transmission band may be formed by two contiguous 40 MHz bands. However, a 160 MHz band may be formed by two contiguous or non-contiguous 80 MHz bands. Different BSSs may employ different primary channels.

As mentioned above, the transmission band of a BSS contains the primary channel and zero or more secondary channels. The secondary channels may be used to increase data transfer capacity of a transmission opportunity (TXOP). The secondary channels may be called a secondary channel, a tertiary channel, a quaternary channel, etc. However, let us for the sake of simplicity use the secondary channel as the common term to refer also to the tertiary or quaternary channel, etc. The primary channel may be used for channel contention, and a TXOP may be gained after successful channel contention on the primary channel. Some IEEE 802.11 networks are based on carrier sense multiple access with collision avoidance (CSMA/CA) for channel access. Some networks may employ enhanced distributed channel access (EDCA) which provides quality-of-service (QoS) enhancements to medium access control (MAC) layer. The QoS enhancements may be realized by providing a plurality of access categories (AC) for prioritizing frame transmissions. The access categories may comprise the following priority levels in the order of increasing priority: background (AC_BK), best effort (AC_BE), video streaming (AC_VI), and voice (AC_VO). A higher priority frame transmission may use a shorter contention window and a shorter arbitration inter-frame spacing (AIFS) that result in higher probability of gaining the TXOP.

As described above, the BSS may be represented by the access node and one or more terminal devices connected to the access node. A terminal device 104, 106 may establish a connection with any one of the access nodes 100, 102 it has detected to provide a wireless connection within the neighborhood of the terminal device. The connection establishment may include authentication in which an identity of the terminal device is established in the access node. The authentication may comprise exchanging an encryption key used in the BSS. After the authentication, the access node and the terminal device may carry out association in which the terminal device is fully registered in the BSS, e.g. by providing the terminal device with an association identifier (AID). It should be noted that in other systems terms authentication and association are not necessarily used and, therefore, the association of the terminal device to an access node should be understood broadly as establishing a connection between the terminal device and the access node such that the terminal device is in a connected state with respect to the access node and scanning for downlink frame transmissions from the access node and its own buffers for uplink frame transmissions.

The access nodes 100, 102 may be configured to support multi-antenna transmission and MIMO (multiple-input-multiple-output) transmissions. The MIMO transmissions may be used to provide multi-user MIMO (MU-MIMO) communications where the access node generates multiple spatially separate communication beams (illustrated by dotted lines in FIG. 1), and each beam is used to communicate with a subset of terminal devices of the wireless network of the access node. Referring to FIG. 1, the access point 100 may have configured three beams, wherein terminal device 104 may be reached with one beam and terminal device 106 with another beam. This enables the terminal devices 104, 106 to communicate simultaneously on the same frequency band with the access point 100. The access point 102 similarly has generated multiple beams to support the MU-MIMO communication. The access points and some terminal devices may further support single-user MIMO (SU-MIMO) in which the access point generates multiple spatially separated channels towards a single terminal device and uses them for transmitting several spatially multiplexed data streams in the same time-frequency resource. This increases system capacity. Another alternative is to employ so called, spatial diversity of MIMO channel to improve the data rate and/or reliability of the SU single stream communications. The terminal devices 104, 106 may comprise one or more antennas in their radio front ends and, thus, support either single antenna or multi-antenna transmissions.

Figure 2:
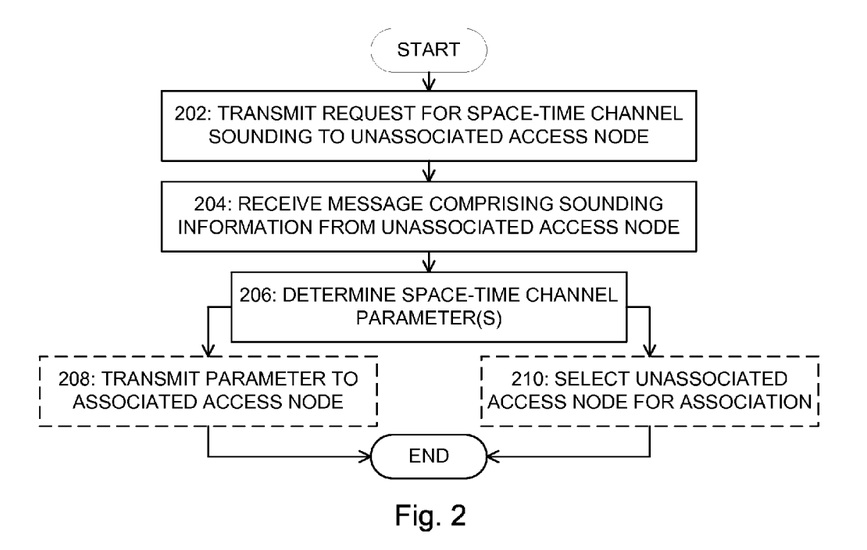
FIG. 2 is a flow diagram of a process for carrying out space-time channel sounding according to an embodiment of the invention.

Terminal devices 104, 106 may be configured to carry out network discovery in order to detect new access nodes. The network discovery may be carried out with a purpose of making an association to a new access node or reporting the presence of neighbouring wireless networks to an access node currently associated to the terminal device. Other reasons for carrying out the network discovery may exist. In the network discovery, the terminal device may carry out scanning for signals transmitted by unassociated access nodes, i.e. access nodes to which the terminal device is not currently associated. Upon detecting a signal transmitted by the unassociated access node, the terminal device may determine channel conditions towards the unassociated access node. The determination of the channel conditions may be called channel sounding FIG. 2 illustrates a flow diagram of an embodiment where the terminal device or, in general, an apparatus carries out space-time channel sounding. The space-time channel sounding may comprise determining spatial parameters of the channel between the apparatus and the unassociated access node. The determining of the spatial parameters may comprise distinguishing spatially separated signal streams that exist or may be generated in the radio channel between the apparatus and the unassociated access node.

Referring to FIG. 2, apparatus causes transmission of a request for space-time channel sounding to at least one unassociated access node in block 202. The unassociated access node may be a candidate for providing the terminal device with a wireless association. In block 204, the apparatus receives, as a multi-antenna transmission and in response to said request of block 202, at least one message comprising space-time sounding information from at least one unassociated access node. Embodiments of the space-time sounding information are described below with reference to FIGS. 3 and 4. In block 206, the apparatus determines at least one parameter describing space-time channel quality from the received space-time sounding information. The terminal device may then carry out at least one of the following operations on the basis of the determined at least one parameter describing the space-time channel quality between the apparatus and the unassociated access node. In block 208, the apparatus causes transmission of the at least one determined parameter to an associated access node, that is an access node currently serving the apparatus with wireless connectivity. The access node currently serving the apparatus may be the associated access node for the apparatus. In block 210, the apparatus causes selection of an unassociated access node for further communication based at least partly on the determined at least one parameter.

Carrying out the space-time channel sounding in the unassociated state with respect to the access node being scanned may reduce overhead with respect to situations where the terminal device needs to first connect to the access node before carrying out the space-time channel sounding. It may also provide the associated access node a fast and convenient method for discovering neighbouring wireless networks and their spatial coverage areas. The access node may use this information to reconfigure its MIMO parameters, e.g. realign its radio beams, and/or to control or propose handovers of terminal devices.

Figure 3:
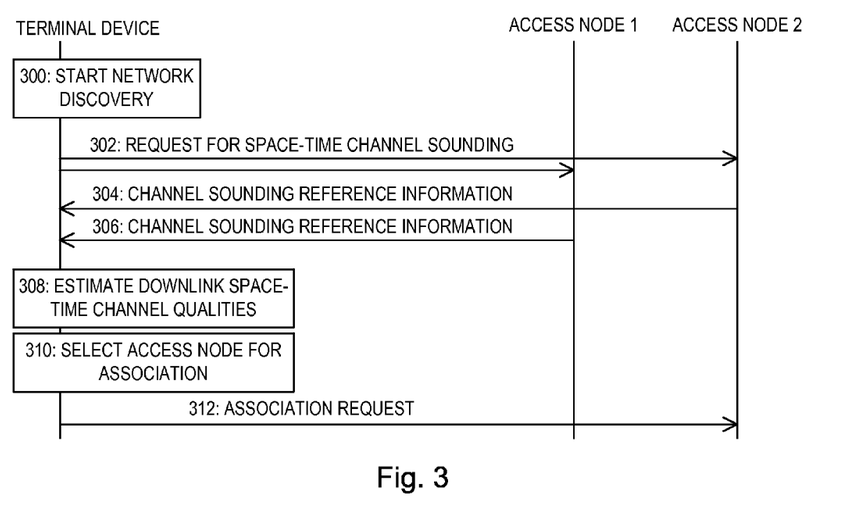
FIGS. 3 and 4 illustrate signalling diagrams of embodiments for carrying out uplink and downlink channel sounding according to some embodiments of the invention.

The above-described space-time channel sounding may be carried out for uplink (from the terminal device towards the unassociated access node) and/or for downlink (from the unassociated access node towards the terminal device). Let us now describe such embodiments with reference to FIGS. 3 and 4. In the Figures, steps denoted by the same reference signs refer to the same or substantially similar operations. Referring to FIG. 3, the terminal device starts network discovery in block 300. The launch of block 300 may be triggered by powering up the terminal device, a command from an access node currently associated to the terminal device, occurrence of a scheduled network discovery period, etc.

The terminal device may carry out the space-time channel sounding as active scanning. The active scanning may comprise the terminal device transmitting a scanning request to the unassociated access node(s) and, as response, the unassociated access node(s) transmit(s) the channel sounding information to the terminal device. In step 302, the terminal device sends such a scanning request to a first access node and a second access node. Neither access node is currently associated to the terminal device although they may have associations to other terminal devices. The terminal device may have discovered the presence of the first access node and the second access node as a result of passive scanning, e.g. detection of a beacon signal transmitted by the first access node and the second access node. The scanning request message may be a probe request of the IEEE 802.11 networks. The scanning request may comprise a sounding request field of Table 1.

TABLE 1

| NDP Included | NDP Requested | Association Recommendation Requested | Reserved |
|---|---|---|---|
| 1 bit | 1 bit | 1 bit | 5 bits |

The NDP included bit may be set to one value to indicate that the terminal device will send a channel sounding reference signal to the unassociated access node and, otherwise, the bit may be set to the other value. Setting this bit configures the sounding to comprise uplink channel sounding. In an embodiment, the uplink channel sounding reference signal is transmitted in the same transmission opportunity as the transmission opportunity of the scanning request.

The NDP Requested bit may be set to one value to indicate that the terminal device requests the unassociated access node to transmit the channel sounding reference signal to the terminal device and, otherwise, the bit may be set to the other value. Setting this bit configures the sounding to comprise downlink channel sounding. In an embodiment, the downlink channel sounding reference signal is transmitted in the same transmission opportunity as the transmission opportunity of a scanning response responding to the scanning request. In embodiments where the scanning request is the probe request, the scanning response may be a probe response.

The Association Recommendation Requested bit may be set to one value if the terminal device requests the unassociated access node to recommend an access node to which the terminal device should associate.

In the embodiment of FIG. 3, let us assume that the terminal device sets the NDP requested bit but not the NDP included bit. As a consequence, only downlink channel sounding is performed. Upon extracting the scanning request (s) received from the terminal device, the first access node and the second access node determine that the terminal device requests for transmission of the channel sounding reference signal. In step 304, the second access node transmits a downlink channel sounding reference signal to the terminal device, and the first access node transmits a downlink channel sounding reference signal to the terminal device in step 306.

Figure 6:
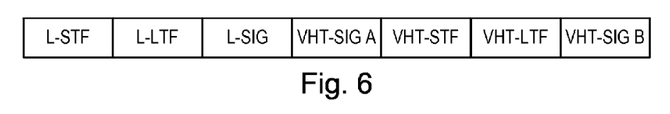
FIG. 6 illustrates an example of a channel sounding reference message according to an embodiment of the invention.

The channel sounding reference signal may comprise a null data packet (NDP). FIG. 6 illustrates an embodiment of the structure of the null data packet. The null data packet may comprise a physical layer convergence protocol (PLOP) header but no medium access control header, for example. As in a conventional null data packet according to IEEE 802.1n and 802.11ac standards, the null data packet may comprise a legacy short training field (L-STF), a legacy long training field (L-.LTF), legacy signal (L-SIG) field, a very high throughput signal (VHT-SIG) A field, a very high throughput short training field (VHT-STF), a very high throughput long training field (VHT-LTF), and very high throughput signal (VHT-SIG) B field. In an embodiment focused to comply with 802.11n null data packet frames, a high throughput signal (HT-SIG) field of the null data packet frames may be arranged to comprise an information element discriminating the null data packet used for the channel estimation. At least one of the training fields may comprise at least one channel sounding reference signal which is a training sequence known to a receiver of the null data packet (the terminal device in the embodiment of FIG. 3). With respect to the multi-antenna transmission employed by the access nodes, the first access node and the second access node may send a different channel sounding reference signal in each spatial stream currently employed or otherwise send different signal contents to the different spatial streams. This enables the terminal device to carry out the channel estimation separately for each stream and identify signal components of different spatial streams.

Each access node may send a scanning response in connection with the channel sounding reference information. The scanning response and the channel sounding reference information may be sent in different frames or in the same frame. The scanning response may comprise a sounding response field of Table 2:

TABLE 2

| NDP Included | Beamforming Included | Association Recommendation Included | Reserved |
|---|---|---|---|
| 1 bit | 1 bit | 1 bit | 5 bits |

The NDP Included bit may be set to one value to indicate that the access node will transmit the channel sounding reference signal in connection with the scanning response, e.x. during the same TXOP and, otherwise, it may be set to the other value.

The Beamforming Included bit may be set to one value to indicate that the access node will transmit a MIMO information frame or channel state information (CSI) report frame, depending on the capabilities of the access node. The Beamforming included bit may indicate whether or not the access node supports or currently employs MU-MIMO. The MIMO information may comprise information on the spatial streams currently employed by the access node, their channel qualities such as channel signal-to-interference-plus-noise (SINR) estimates, communication parties, directions of the beams etc. In an embodiment, the access node may transmit the MIMO information in a VHT Compressed Beamforming element of the 802.11 networks. The MIMO information may comprise MIMO control information, beamforming information, etc.

The Association Recommendations Transmitted bit may be set to one value to indicate the access node or another device from the network of the access node will transmit an association recommendation frame to the terminal device.

The sounding announcement field may serve as an announcement that the channel quality estimation is associated with the scanning response. It may indicate to all terminal devices receiving the scanning response that transmission of a channel sounding reference signal is transmitted in connection with the scanning response.

In block 308, the terminal device estimates the spatiotemporal downlink quality of each spatial signal stream between the terminal device and respective access nodes. The terminal device may estimate at least one of the following in block 308, precoding weight(s) for each spatial stream, a metric representing signal strength of each spatial stream, a rank of the channel, and deterioration of channel quality as a result of precision granularity. The metric representing the signal strength may comprise at least one of the following: a received signal strength or power, a signal-to-noise ratio, and a signal-to-interference-plus-noise ratio. The channel rank represents the number of spatially uncorrelated streams detected between the terminal device and the access node, and its estimation may be carried out according to the state-of-the-art methods. The deterioration of channel quality as a result of precision granularity may be estimated by comparing the estimated channel quality with channel quality the terminal device intends to report or use in the association. The estimated channel quality may be quantized or otherwise rounded to a certain value which may cause using an inaccurate estimate in post-processing. For example, the terminal device may compute optimal precoding or beamforming weights from the received channel sounding reference signals, compare the optimal weights with a predetermined codebook comprising weights the terminal device is able to use and determine a difference between the optimal weights and the closest codebook weights. This difference may represent the deterioration of the channel quality as a result of finite precision in the codebook. The deterioration of the channel quality as a result of the finite precision may also be considered as an estimate of an offset of the terminal device from a radio beam directed from the access node towards the terminal device or from the terminal device towards the access node. Any one of the above-described quality metrics may be comprised in the at least one parameter the terminal device computes in block 206.

Upon determining the spatio-temporal channel qualities of the channels between the terminal device and each of the first access node and the second access node, the terminal device may send the spatio-temporal channel qualities to the respective access nodes. The terminal device may send the spatio-temporal channel qualities determined from the channel sounding reference information received from the first access node to the first access node, and the spatio-temporal channel qualities determined from the channel sounding reference information received from the second access node to the second access node.

The terminal device may select an access node for association in block 310 on the basis of the estimated channel qualities. The terminal device may select the access node according to a determined criterion, e.g. the access node providing streams with the highest signal strength(s), the access node providing the channel with the highest rank, the access node providing the most optimal precoding configuration, etc. In step 312, the terminal device sends an association request to the selected access node (the second access node in this example) and starts to establish association to the selected access node.

In the embodiment of FIG. 3, the space-time sounding information described in connection with FIG. 2 may comprise the channel sounding reference signals transmitted by the access nodes to the terminal device.

In other embodiments, the terminal device and the unassociated access nodes may exchange messages other than the scanning request and scanning response messages. The messages may comprise, for example, messages dedicated for use when carrying out channel sensing towards the unassociated access nodes.

Figure 4:
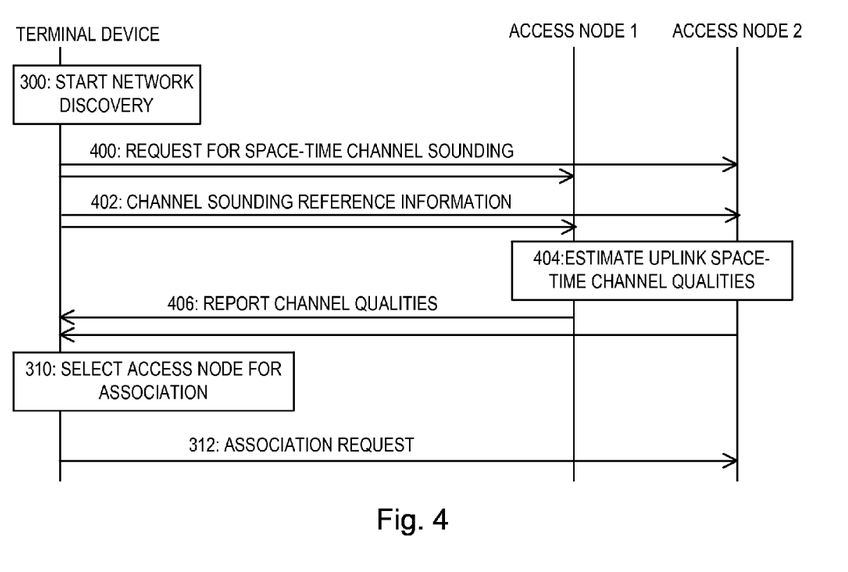

The procedure of FIG. 4 is substantially similar to the procedure of FIG. 3 but the terminal device now sends the channel sounding reference signal and the access node(s) estimate the uplink channel qualities and report them to the terminal device. Referring to FIG. 4, the terminal device starts the network discover in block 300 and sends the request for the space-time channel sounding to the access nodes in step 400. In this example, the terminal device may set the NDP included bit to indicate that the terminal device will transmit the channel sounding reference signal. In step 402, the terminal device may send the above-described null data packet as the channel sounding reference signal. The terminal device may send a separate null data packet to the different access nodes, and the terminal device may send one or more null data packets to the same access node depending on the number of antennas comprised in the terminal device. The number of null data packets transmitted to one access node may equal to the number of antennas in the transmitter or the number of spatial streams employed by the transmitter, as is the case in steps 304 and 306. The null data packet sent from each antenna or to each spatial stream may be otherwise identical but a different VHT-LTF sequence may be transmitted from different antennas or to different spatial streams. This enables the receiver to estimate the different spatial channels. In block 404, each access node estimates the uplink space-time channel qualities from the received null data packet. The access nodes may further locate the terminal device on the basis of determining in which radio beam of the access node the transmission of the terminal device was received. The access nodes may further improve the positioning accuracy by determining signal strength and/or an angle of arrival of the uplink channel sounding reference signal received from the terminal device. The estimation may be substantially similar to the estimation in block 308 with the difference that the access nodes estimate the uplink. In step 406, the access nodes send a scanning response comprising the estimated uplink channel qualities. The channel qualities may be reported in a VHT Compressed Beamforming element of 802.11, for example. Thereafter, the process is similar to that of FIG. 3, i.e. the terminal device may select an access node to which to associate.

Yet another embodiment combines the embodiments of FIGS. 3 and 4 and provides estimates of both uplink and downlink space-time channels. In this embodiment, the terminal device may send the scanning request first and set both NDP included and NDP requested fields to indicate the presence of the channel sounding reference signal. The terminal device may then transmit the uplink channel sounding reference signal(s) after the scanning request (step 402), the access nodes estimate the uplink space-time channel (block 404) and report the channel qualities to the terminal device in a scanning response in step 406. In connection with sending the scanning response, each access node may transmit the downlink channel sounding reference signal(s) (steps 304, 306), and the terminal device may estimate the downlink space-time channel then (block 308).

In an embodiment, the access nodes may be configured to transmit and the terminal device to receive the scanning response as an omnidirectional transmission and the null data packet(s) as beamformed transmission, wherein the beamforming may be understood such that the access node and/or the terminal device has applied a directional pattern to alter their antenna beam(s) with precoding weights. The scanning response may contain management information usable for other terminal devices as well and/or the scanning response may function as a general announcement that a spatial channel sounding reference signal transmission will follow the scanning response. By using the omnidirectional transmission, the access node may ensure that all the terminal devices of its wireless network receive the scanning response. The null data packet or the channel sounding reference signal(s) may be transmitted by using multi-antenna transmission where the beamforming is applied to direct the radio beam(s). The access node employing MU-MIMO may estimate a spatial stream or a direction from which it receives the scanning request by using conventional multi-antenna signal processing functions. The access node may then direct the channel sounding reference signals to the same direction or spatial stream from which it received the scanning request. In other embodiments, the null data packet or the channel sounding reference signal(s) are transmitted as the omnidirectional transmission without manipulating signal delays of different transmitter antennas to direct the radio beams. In such embodiments, the terminal device may estimate the channel quality without any bias or additional gain caused by the beamforming.

In an embodiment, the terminal device may send at least some of the estimated space-time channel parameters to the selected access node in the association request in step 312. For example, the terminal device may send the computed precoding weights, optionally matched to the predetermined codebook values, to the access node when establishing the association. This expedites the setup of the communication link, as the precoding weights need not to recomputed after the association has been completed. In the embodiments applied to the 802.11 networks, the precoding weights may be sent to the access node in an association request comprising VHT Compressed Beamforming element.

Figure 5:
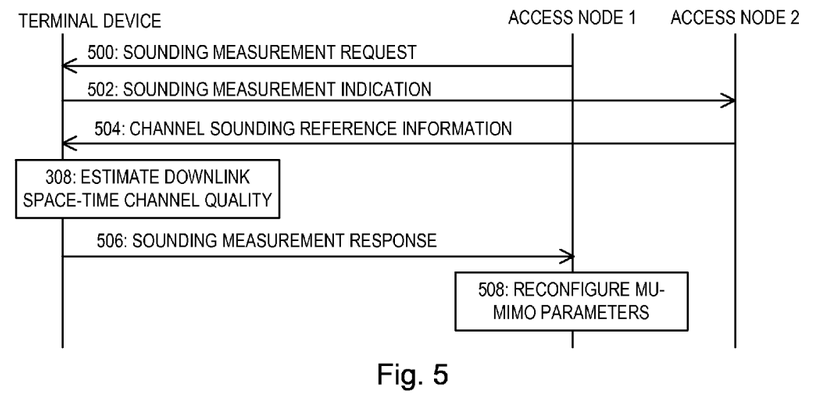
FIG. 5 illustrates a signalling diagram of a procedure for carrying out channel sounding towards neighbouring wireless networks according to an embodiment of the invention.

In the above-described embodiments, the space-time channel sounding is carried out with the purpose of making a new association or at least determining channel qualities towards candidate access nodes for the new association. In the embodiment of FIG. 5, the space-time channel sounding towards the unassociated access nodes is made with the purpose of providing an associated access node with information on neighboring networks. Referring to FIG. 5, the neighbor scanning may be triggered by the associated access node (the first access node in this example). Upon determining the carry out the neighbor scanning, the associated access node may transmit a sounding measurement request to the terminal device (step 500). The sounding measurement request may request the terminal device to carry out the above-described space-time channel sounding towards the unassociated access nodes. Let us assume in this example that the second access node represents the unassociated access node that has no association with the terminal device.

In response to receiving the sounding measurement request in step 500, the terminal device may start the space-time channel sounding towards the unassociated access node(s). This may comprise tuning to the channel(s) of the unassociated access node(s). In step 502, the terminal device sends a sounding measurement indication to the unassociated access nodes. The sounding measurement indication may be the above-described scanning request requesting the receiving access node to carry out channel measurements, as described above. In other embodiments, the sounding measurement indication may be a dedicated frame differing logically from the above-described scanning request.

In response to the sounding measurement indication, the transfer of the channel sounding reference signal(s) may be carried out in the above-described manner and the uplink and/or downlink space-time channel quality may be estimated in the terminal device or the unassociated access node(s) (step 504). FIG. 5 illustrates only the downlink channel quality estimation. As a result, the terminal device acquires the uplink and/or downlink space-time channel quality (block 308). Then, the terminal device may transmit the space-time channel quality values to the associated access node in a sounding measurement response in step 506. The transmission of the sounding measurement response may comprise multiple frame transmissions, e.g. transmission of the VHT Compressed Beamforming frame for each unassociated access node measured. The terminal device may further transmit the space-time channel qualities to respective unassociated access nodes, as described above.

Upon receiving the space-time channel qualities of the terminal device towards the other access nodes, the associated access node may use this information to make recommendations for a new association to the terminal device and/or reconfigure its MIMO parameters (block 508). The access node may use the information to make recommendations for a handover of other terminal devices that reside in the same beam as the terminal device which sent the sounding measurement response in step 506. When making decisions of the access node to recommend to the terminal device for handover, the associated access node may use other input as well, e.g. congestion, capacity, and/or backbone load.

The access node may reconfigure its MIMO parameters by realigning its radio beam(s) towards the reporting terminal device. For example, if the access node determines on the basis of the measurement report received from the terminal device that the terminal device is able to receive signals from multiple different access nodes with a strength that exceeds a determined threshold, the access node may determine that its wireless network has overlapping coverage with at least one other wireless network. This may cause interference, and the access node may choose to realign its radio beam(s) that is/are directed towards the terminal device in an attempt to reduce the overlapping. The report may provide information enabling the access node to determine realigning parameters, e.g. strength and/or direction of the beam(s), or the access node may use opportunistic realigning.

Figure 7:
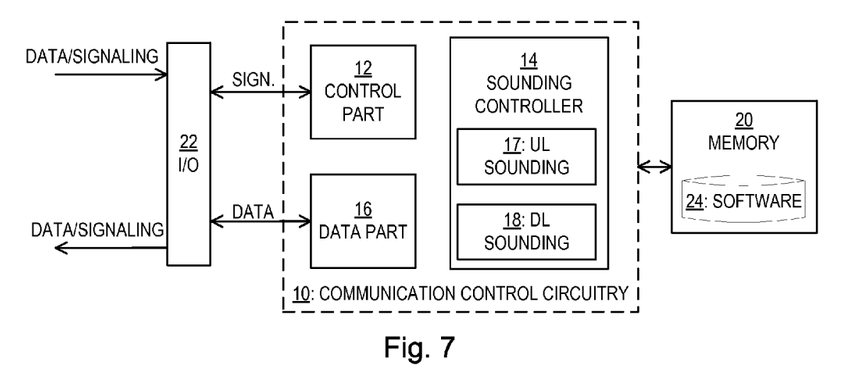
FIG. 7 illustrates a block diagram of a structure of an apparatus according to an embodiment of the invention.

FIG. 7 illustrates an embodiment of an apparatus comprising means for carrying out the above-mentioned functionalities of the terminal device. The terminal device may comply with specifications of an IEEE 802.11 network and/or another wireless network. The terminal device may also be a cognitive radio apparatus capable of adapting its operation to a changing radio environment, e.g. to changes in parameters of another system on the same frequency band. The terminal device may be or may be comprised in a computer (PC), a laptop, a tablet computer, a cellular phone, a palm computer, or any other wireless apparatus provided with radio communication capability. In another embodiment, the apparatus carrying out the above-described functionalities of the terminal device is comprised in such a wireless apparatus, e.g. the apparatus may comprise a circuitry, e.g. a chip, a processor, a micro controller, or a combination of such circuitries in the wireless apparatus.

Referring to FIG. 7, the apparatus may comprise a communication controller circuitry 10 configured to control wireless communications in the terminal device. The communication controller circuitry 10 may configure the establishment, operation, and termination of connections or associations in the apparatus, as described above. The communication controller circuitry 10 may comprise a control part 12 handling control signalling communication with respect to transmission, reception, and extraction of control or management frames including the above-described scanning request messages, scanning response messages, channel sounding reference signals, etc. The control part 12 may additionally carry out channel sensing procedures in order to scan the channel(s) of the wireless networks for beacon messages or other messages that may be used in the channel sensing and estimation of the space-time channel quality. The communication controller circuitry 10 may further comprise a data part 16 that handles transmission and reception of payload data when the terminal device is associated to one or more access nodes and/or to one or more wireless devices.

The communication control circuitry 10 may further comprise a sounding controller circuitry 14 configured to control the above-described channel sounding procedures of the terminal device. The sounding controller circuitry 14 may be configured to launch a space-time channel sounding procedure towards the unassociated access node(s) upon receiving a command from the associated access node through the control part 12 or upon determining to search for new access points for handover or creation of a new association. The sounding controller circuitry 14 may comprise an uplink sounding circuitry 17 configured to carry out the operations of the terminal device in FIG. 4, and/or a downlink sounding circuitry 18 configured to carry out the operations of the terminal device in FIG. 3. Upon carrying out the channel sounding and estimating the space-time channel qualities towards the unassociated access node(s), the sounding controller circuitry 14 may be configured to output the channel quality results to the control part 12 for transmission to the associated access node and/or unassociated access node(s) or to a connection controller managing active connections or associations in the terminal device.

The circuitries 12 to 18 of the communication controller circuitry 10 may be carried out by the one or more physical circuitries or processors. In practice, the different circuitries may be realized by different computer program modules. Depending on the specifications and the design of the apparatus, the apparatus may comprise some of the circuitries 12 to 18 or all of them.

The apparatus may further comprise a memory 20 that stores computer programs (software) 24 configuring the apparatus to perform the above-described functionalities of the terminal device. The memory 20 may also store communication parameters and other information needed for the wireless communications, e.g. addresses and other parameters assigned to the terminal device with respect to different associations, channel estimation algorithms, etc. The apparatus may further comprise radio interface components 22 providing the apparatus with radio communication capabilities within one or more wireless networks. The radio interface components 22 may comprise standard well-known components such as an amplifier, filter, frequency-converter, (de) modulator, and encoder/decoder circuitries and one or more antennas. The apparatus may further comprise a user interface enabling interaction with the user of the communication device. The user interface may comprise a display, a keypad or a keyboard, a loudspeaker, etc.

In an embodiment, the apparatus carrying out the embodiments of the invention in the terminal device comprises at least one processor and at least one memory including a computer program code, wherein the at least one memory and the computer program code are configured, with the at least one processor, to cause the apparatus to carry out the functionalities of the terminal device according to any one of the embodiments of FIGS. 2 to 6. Accordingly, the at least one processor, the memory, and the computer program code form processing means for carrying out embodiments of the present invention in the terminal device.

As used in this application, the term 'circuitry' refers to all of the following: (a) hardware-only circuit implementations such as implementations in only analog and/or digital circuitry; (b) combinations of circuits and software and/or firmware, such as (as applicable): (i) a combination of processor (s) or processor cores; or (ii) portions of processor(s)/ software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to all uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/ or a field-programmable grid array (FPGA) circuit for the apparatus according to an embodiment of the invention.

The processes or methods described in FIGS. 2 to 6 may also be carried out in the form of a computer process defined by a computer program. The computer program may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

The present invention is applicable to wireless systems defined above but also to other suitable communication systems. The protocols used, the specifications of communication systems, their network elements and terminals device, develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. The invention and its embodiments are not limited to the examples described above but may vary within the scope of the claims.

The invention claimed is:

1. A method comprising:
    causing, by an apparatus, transmission of a request for space-time channel sounding to an unassociated access node;
    receiving, in the apparatus as a multi-antenna transmission, spatially separate data streams comprising space-time sounding information from the unassociated access node, wherein receiving the space-time sounding information comprises receiving a different channel sounding reference signal for each of the spatially separate data streams;
    determining, by the apparatus, at least one parameter describing space-time channel quality from the received space-time sounding information; and
    causing, by the apparatus, transmission of the at least one parameter to an associated access node or causing selection of the unassociated access node for further communication based at least partly on the at least one parameter.

2. The method of claim 1, wherein the request for the space-time channel sounding comprises at least one of a probe request and a space-time channel sounding measurement indication.

3. The method of claim 1, wherein the apparatus is a terminal device associated with the associated access node.

4. The method of claim 1, further comprising receiving, from the unassociated access node before the reception of the spatially separate data streams, a response to said request via omnidirectional transmission, the response serving as a channel sounding announcement.

5. The method of claim 1, wherein each of the spatially separate data streams comprises a probe response or a message received after receiving a probe response.

6. The method of claim 1, wherein each of the spatially separate data streams comprises a null data packet frame.

7. The method of claim 1, wherein the request comprises a request to recommend an access node for an association, the method further comprising: receiving, in the apparatus, a frame comprising an information element indicating an identifier of the access node recommended for association.

8. The method of claim 1, wherein the request comprises a notification that the apparatus will send a message comprising uplink space-time sounding information, the method further comprising: causing, by the apparatus, transmission of the message after the request.

9. The method of claim 8, wherein the message is a null data packet.

10. The method of claim 1, wherein the at least one parameter comprises at least one of the following: a rank of a space-time channel specifying a number of spatially uncorrelated data streams between the apparatus and the unassociated access node, a metric representing received signal strength for one or more of the spatially separate data streams, and an estimate representing deterioration of the space-time channel quality.

11. An apparatus comprising:
at least one processor; and
at least one memory including a computer program code, wherein the at least one memory and the computer program code are configured, with the at least one processor, to cause the apparatus to:
cause transmission of a request for space-time channel sounding to an unassociated access node;
receive, as a multi-antenna transmission, spatially separate data streams comprising space-time sounding information from the unassociated access node, wherein receiving the space-time sounding information comprises receiving a different channel sounding reference signal for each of the spatially separate data streams;
determine at least one parameter describing space-time channel quality from the received space-time sounding information; and
cause transmission of the at least one parameter to an associated access node or cause selection of the unassociated access node for further communication based at least partly on the at least one parameter.

12. The apparatus of claim 11, wherein the request for the space-time channel sounding comprises at least one of a probe request and a space-time channel sounding measurement indication.

13. The apparatus of claim 11, wherein the apparatus is a terminal device associated with the associated access node.

14. The apparatus of claim 11, wherein the at least one memory and the computer program code are configured, with the at least one processor, to cause the apparatus to receive, from the unassociated access node before the reception of the spatially separate data streams, a response to said request via omnidirectional transmission, the response serving as a channel sounding announcement.

15. The apparatus of claim 11, wherein each of the spatially separate data streams comprises a probe response or a message received after receiving a probe response.

16. The apparatus of claim 11, wherein each of the spatially separate data streams comprises a null data packet frame.

17. The apparatus of claim 11, wherein the request comprises a request to recommend an access node for an association, and wherein the at least one memory and the computer program code are configured, with the at least one processor, to cause the apparatus to receive a frame comprising an information element indicating an identifier of the access node recommended for association.

18. The apparatus of claim 11, wherein the request comprises a notification that the apparatus will send a message comprising uplink space-time sounding information, and wherein the at least one memory and the computer program code are configured, with the at least one processor, to cause transmission of the message after the request.

19. The apparatus of claim 18, wherein the message is a null data packet.

20. The apparatus of claim 11, wherein the at least one parameter comprises at least one of the following: a rank of a space-time channel specifying a number of the spatially separate data streams between the apparatus and the unassociated access node, a metric representing received signal strength for one or more of the spatially separate data streams, and an estimate representing deterioration of the space-time channel quality.

21. The apparatus of claim 11, further comprising radio interface circuits providing the apparatus with radio communication capability.

22. A non-transitory computer readable medium comprising program instructions which, when loaded into an apparatus, cause the apparatus to:
cause transmission of a request for space-time channel sounding to an unassociated access node;
receive, as a multi-antenna transmission, spatially separate data streams comprising space-time sounding information from the unassociated access node, wherein receiving the space-time sounding information comprises receiving a different channel sounding reference signal for each of the spatially separate data streams;
determine at least one parameter describing space-time channel quality from the received space-time sounding information; and
cause transmission of the at least one parameter to an associated access node or cause selection of the unassociated access node for further communication based at least partly on the at least one parameter.

* * * * *